United States Patent
Storer et al.

(10) Patent No.: US 11,435,300 B2
(45) Date of Patent: Sep. 6, 2022

(54) METHOD AND APPARATUS FOR ANALYSING PARTICULATE MATERIAL

(71) Applicant: FCT ACTECH PTY LTD, South Australia (AU)

(72) Inventors: Peter J. Storer, South Australia (AU); Nick P. Absalom, South Australia (AU); David S. Rapson, South Australia (AU); Bogdan A. Iancu, South Australia (AU); Simon G. Marschall, South Australia (AU)

(73) Assignee: FCT ACTECH PTY LTD., Thebarton (AU)

( * ) Notice: Subject to any disclaimer, the term of this patent is extended or adjusted under 35 U.S.C. 154(b) by 261 days.

(21) Appl. No.: 16/614,434

(22) PCT Filed: May 11, 2018

(86) PCT No.: PCT/AU2018/050447
§ 371 (c)(1),
(2) Date: Nov. 18, 2019

(87) PCT Pub. No.: WO2018/209381
PCT Pub. Date: Nov. 22, 2018

(65) Prior Publication Data
US 2020/0182809 A1    Jun. 11, 2020

(30) Foreign Application Priority Data
May 16, 2017    (AU) ................ 2017901819

(51) Int. Cl.
*G01N 23/207* (2018.01)
*G01N 1/28* (2006.01)
*G01N 23/223* (2006.01)

(52) U.S. Cl.
CPC .......... *G01N 23/207* (2013.01); *G01N 1/286* (2013.01); *G01N 23/223* (2013.01); *G01N 2001/2866* (2013.01); *G01N 2223/076* (2013.01)

(58) Field of Classification Search
None
See application file for complete search history.

(56) References Cited

U.S. PATENT DOCUMENTS

| 4,991,191 A | 2/1991 | Suryanarayanan |
| 6,111,930 A | 8/2000 | Schipper |
| (Continued) | | |

FOREIGN PATENT DOCUMENTS

| EP | 3064931 A1 | 9/2016 |
| KR | 1020150145861 A | 12/2015 |
| (Continued) | | |

OTHER PUBLICATIONS

Australian Search Report for corresponding application 2017901819 Filed May 16, 2017; dated Apr. 26, 2018.
(Continued)

*Primary Examiner* — Hoon K Song
(74) *Attorney, Agent, or Firm* — Cantor Colburn LLP

(57) ABSTRACT

A method and apparatus for analysing particulate material having one or more crystalline substances, the apparatus including: a grinder for receiving a sample extracted from the particulate material and grinding the sample into powdered material having a designated particle size; a measurement station including an X-ray generator for illuminating the powdered material with an X-ray beam and an X-ray detector for detecting X-ray diffraction patterns from the powdered material; a carrier for receiving the powdered material from the grinder and conveying the powdered material through the measurement station; and a processor (Continued)

configured to: receive the X-ray diffraction patterns of the powdered material from the X-ray detector; analyse the X-ray diffraction patterns to determine a series of sequential composition determinations of one or more crystalline substances in the powdered material as the carrier conveys the powdered material through the measurement station; and determine composition of the one or more crystalline substances in the sample from the series of sequential composition determinations.

22 Claims, 3 Drawing Sheets

(56) References Cited

U.S. PATENT DOCUMENTS

| | | | |
|---|---|---|---|
| 7,703,217 B2* | 4/2010 | Tada | F26B 5/04 |
| | | | 34/412 |
| 7,796,726 B1 | 9/2010 | Gendreau | |
| 2007/0263212 A1* | 11/2007 | Mound | G01N 21/85 |
| | | | 356/326 |
| 2010/0111251 A1 | 5/2010 | Yellepeddi | |
| 2012/0288058 A1* | 11/2012 | Maeyama | G01N 23/223 |
| | | | 378/46 |
| 2013/0105677 A1* | 5/2013 | Barrett | H01J 37/20 |
| | | | 250/252.1 |
| 2015/0246849 A1 | 9/2015 | Yamashita | |
| 2015/0362445 A1* | 12/2015 | Takahashi | G01N 35/00693 |
| | | | 378/44 |

FOREIGN PATENT DOCUMENTS

| | | |
|---|---|---|
| WO | 0079252 A1 | 12/2000 |
| WO | 03031959 A2 | 4/2003 |
| WO | 2015163853 A1 | 10/2015 |

OTHER PUBLICATIONS

International Preliminary Report on Patentability for corresponding application PCT/AU2018/050447 filed May 11, 2018; dated Sep. 9, 2019.

International Search Report for corresponding application PCT/AU2018/050447 filed May 11, 2018; dated Jun. 29, 2018.

Written Opinion for corresponding application PCT/AU2018/050447 filed May 11, 2018; dated Jun. 29, 2018.

B.H. O'Conner, "Attaining 1% Accuracy in Absolute Phase Composition Levels by Rietveld Analysis", International Centre for Diffraction Data, Advances in X-Ray Analysis, vol. 43, 2000.

European Search Report for corresponding application EP18802208; Report dated Feb. 26, 2021.

Herzog XRD-Automation, Aug. 2011, URL: http://www.impautomation.com, XP055167413.

Jan Skakle, "Applications of X-Ray Powder Diffraction in Materials Chemistry", The Chemical Record vol. 5, 252-262, 2005.

Steve J. Chipera, "Fitting Full X-Ray Diffraction Patterns for Quantitative Analysis: A Method for Readily Quantifying Crystalline and Disordered Phases", Advanced Materials Physics and Chemistry, 2013, 3, 47-53.

* cited by examiner

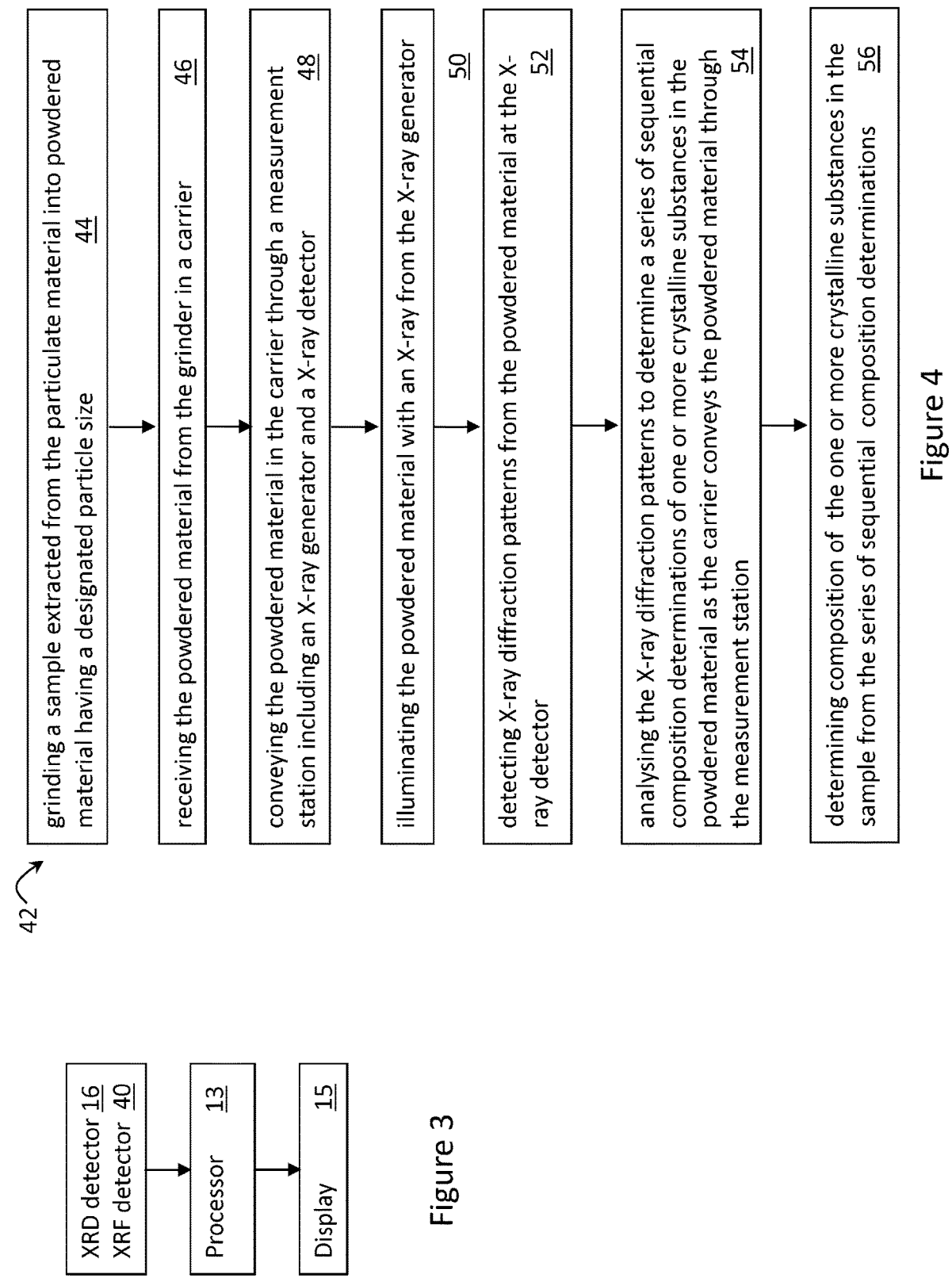

METHOD AND APPARATUS FOR ANALYSING PARTICULATE MATERIAL

FIELD OF THE INVENTION

The present invention relates to a method and apparatus for analysing particulate material having one or more crystalline substances. The present invention particularly, but not exclusively, relates to determining composition of one or more crystalline substances in a cement or ore sample by X-ray diffraction. The present invention further, but not exclusively, relates to determining elemental composition of substances in the cement or ore sample by X-ray fluorescence.

BACKGROUND OF THE INVENTION

Existing analysers of particulate material generally employ either destructive techniques, such as chemical analysis, or non-destructive techniques, such as spectral analysis, to analyse the mineralogy of a sample of the material. Spectral analysers typically require that a sample is obtained and prepared for the spectral analysis by grinding the sample and forming individual sample pellets of the order of a few grams for presentation to the analyser for analysis.

In respect of cement manufacturing, feedstock materials such as limestone, shale, sand and iron oxide are blended, milled and then fired in a kiln from which cement clinker is derived. The cement clinker, with some additives, is then milled in a ball mill to result in fine cement powder. The strength of the final cement product is significantly determined by the ratio of input materials and the amount of certain minerals, such as lime, in the powder. Current spectral analysers have been used to analyse cement clinker and outputted cement powder to monitor its quality.

Some of these existing cement (or ore) spectral analysers use X-ray diffraction measurements on the cement from the mills to determine an amount of certain minerals in the cement. X-ray diffraction involves the use of an incident X-ray beam directed at a prepared powder sample and a sensor or detector for detecting X-ray beams diffracted from the powder sample. The X-ray beams diffract from the powder sample at distinct characteristic angles to form a diffraction pattern which is rotationally symmetric about a beam axis of the incident X-ray beam, with the distinct characteristic angles depending on the composition of the sample. Crystalline substances in the form of minerals have at least one crystalline phase and their X-ray diffraction pattern is a result of a specific arrangement of atoms within the crystal structure. The angles and intensities of the diffracted X-ray beams can be analysed to determine the crystalline substances present in the sample. That is, the composition of the crystalline substances in the sample material can be analysed based on the distinct characteristic angles of diffraction relative to the beam axis.

One existing example of an analyser for cement (or ore) is a laboratory based X-ray diffraction analyser, which takes measurements of ex-kiln cement clinker and ex-mill cement powder. For such measurements, samples taken from the cement process, either automatically taken or by hand, are delivered to the laboratory where individual samples of the order of only a few grams are prepared and presented to the X-ray diffraction analyser. It will be appreciated by those persons skilled in the art that coarse ex-kiln cement clinker can be of almost any size up to small rock size and needs to be crushed into chips and then ground to a very fine powder (e.g. than 5 μm particle size), using micronizing mills, to be analysed. It will also be appreciated that the finer the particle size, the better for X-ray diffraction due to properties such as crystalline statistics, micro absorption and mass attenuation effects. More specifically, the finer particle size allows for more crystallites to be accessible to the X-ray beam and minimises micro-absorption effects to improve accuracy of the analysis. To analyse this fine particle sized powder, however, further preparation is generally required.

This further sample preparation has many drawbacks as it is time intensive and it limits the usefulness of results for certain applications, such as process control. It is well known by those persons skilled in the art that the sample preparation techniques must be followed with precision by an operator as small changes by, say, different operators can cause large variations in precision and accuracy of the analysis. For example, where the sample powder is pressed into pellets for analysis, the surface of the pellets must be even, dry, flat, have sufficient loading of material, not too much pressure, and the surface finish must be defect free. Furthermore, the fine grinding required of the sample can cause changes in the material affecting the analysis.

Another existing example of a cement analyser is located near the cement mills so that a stream of material from the cement mills can be diverted to be continuously analysed. Here, the analyser receives a sample flow extracted from the stream of material from the mills and performs X-ray diffraction on the sample flow to obtain a diffraction pattern, as described above, to determine an average percentage of crystalline substances in the sample flow. This stream of sample flow, however, can contain particulates having a relatively large distribution of particle sizes, which may not be accurately analysed, and the moving stream may not be presented as a uniform flat bed for analysis due to, for example, the material being "sticky". In addition, the sample flow typically contains non-crystalline substances (i.e. poorly crystalline and/or amorphous substances), such as glassy compounds or slag, fly-ash, and pozzolans, which can affect the accuracy of the analysis.

SUMMARY OF THE INVENTION

Accordingly, an apparatus for analysing particulate material having one or more crystalline substances, the apparatus including: a grinder for receiving a sample extracted from the particulate material and grinding the sample into powdered material having a designated particle size; a measurement station including an X-ray generator for illuminating the powdered material with an X-ray beam and an X-ray detector for detecting X-ray diffraction patterns from the powdered material;

a carrier for receiving the powdered material from the grinder and conveying the powdered material through the measurement station; and a processor configured to: receive the X-ray diffraction patterns of the powdered material from the X-ray detector; analyse the X-ray diffraction patterns to determine a series of sequential composition determinations of one or more crystalline substances in the powdered material as the carrier conveys the powdered material through the measurement station; and determine composition of the one or more crystalline substances in the sample from the series of sequential composition determinations.

Preferably, the particulate material to be analysed includes, but is not limited to: cement product, cement clinker, ore, quarry samples, material from mineral processing plants, mineral products and manufactured/artificial products. The grinder grinds a sample of these different particulate materials into powdered material having a designated particle size.

In an embodiment, the grinder allows relatively coarse particulate material (e.g. up to 14 mm diameter) to be ground into a sufficiently fine powder for the apparatus to analyse the material. The grinder enables the removal of several steps of user interaction with the sample that are described above (e.g. fine grinding and preparing the powdered sample) with respect to the prior art example of a spectral analyser; thereby increasing precision and accuracy of the apparatus. For example, the designated particle size from the grinder has 30% of particles less than 45 µm. The coarser particle size from the grinder, than say the prior art example of 5 µm, is enabled by the carrier conveying a much larger volume of powdered material through the measuring station to determine a series of composition determinations of the powdered material rather than just determining a composition determination of a small static volume of powdered material. In the example, the volume of the powdered material in the above mentioned prior art example is ~1 cm$^3$ and the volume of powdered material conveyed through the measuring station is ~150 cm$^3$.

It will be appreciated by those persons skilled in the art that X-Ray Diffraction (XRD) allows the analysis of crystalline structures in a sample by diffracting X-ray beams through a sample according to Bragg's law. In the above prior art example with a small static volume of ~1 cm$^3$ of material, the amount of diffracting crystallites in the material is small when in a fixed orientation so traditional instruments use a sample spinner to try to overcome this problem. These traditional instruments, however, are still limited to a statistical number of diffraction conditions of the crystallite. Thus, these traditional instruments grind the sample to a very fine particle size (e.g. ~5 µm) to try to maximise the number of crystallites. As mentioned, the greater volume of powdered material conveyed to the X-ray diffraction (XRD) measurement station in the carrier ensures that, even with a larger particle size (e.g. ~50 µm) than the above prior art example, a much larger number of crystallites can still be presented to the XRD measurement station to provide statistically enhanced diffraction data for quantitative analysis.

In an embodiment, the apparatus also includes a plate with a standard material thereon, and the X-ray detector detects an X-ray diffraction pattern from the standard material. For example, the standard material is a mix of different materials, including aluminium powder, mixed with epoxy resin on the plate.

In an embodiment, the processor is configured to receive the X-ray diffraction pattern of the standard material and compare the diffraction pattern of the standard material with an expected diffraction pattern of the standard material to determine a scale factor corresponding to at least in part a flux value of the X-ray generator. The processor is then configured to apply the scale factor to the series of sequential composition determinations of crystalline substances to determine a calibrated composition of the one or more crystalline substances in the sample. It will be appreciated by those persons skilled in the art that X-ray tubes reduce their flux with operational time due to various factors such as tungsten deposition, loss of vacuum, environmental temperature or partial filament failure. This flux can be correlated with the scale factor from the determined and the expected patterns, and is used as compensation for the tube flux variation over time to calibrate and maintain accuracy of the apparatus. Thus, by applying the scale factor, the accuracy of the composition determinations by XRD of the one or more crystalline substances in the sample is improved.

In an embodiment, the particulate material further has poorly crystalline and/or amorphous substances, and the processor is configured to determine composition of one or more poorly crystalline and/or amorphous substances in the powdered material.

In an embodiment, the powdered material is a dosed powdered material that is dosed with a selected poorly crystalline and/or amorphous substance at a designated percentage of the powdered material, and the processor is configured to receive the X-ray diffraction pattern of the dosed powdered material and compare the X-ray diffraction pattern of the dosed powdered material with an expected X-ray diffraction pattern of the selected poorly crystalline and/or amorphous substance to determine a second scale factor. The processor is further configured to apply the second scale factor to determine a calibrated composition of the one or more poorly crystalline and/or amorphous substances in the sample.

In an embodiment, the processor is configured to determine a percentage of a selected one of the poorly crystalline and/or amorphous substances in the sample from the calibrated composition of the one or more poorly crystalline and/or amorphous substances in the sample.

Preferably, the determination of the composition of crystalline, poorly crystalline and amorphous substances in the sample is determined using whole pattern analysis methods, such as Rietveld analysis, and/or using a "library" of patterns for each of the different substances. For example, the expected X-ray diffraction pattern of the standard material is stored in a library in a memory in data communication with the processor, and the processor compares the diffraction pattern of the standard material detected by the X-ray detector with the stored expected diffraction pattern of the standard material to determine the scale factor.

Further, the processor compares the X-ray diffraction pattern of one crystalline substance in the sample with an expected diffraction pattern of that substance in the library to determine a further scale factor. This further scale factor, along with other further scale factors for other crystalline substances can be analysed to determine a relative weight percent of the crystalline substances, and if calibrated can quantify a particular crystalline substance in the sample.

In an embodiment, the plate is disposed on an actuator configured to move the standard material on the plate between a first position in the measurement station and a second positon not in the measurement station. The actuator is further configured to move the standard material into the measurement station before and/or after the carrier conveys the powdered material through the measurement station. That is, in this embodiment, the scale factor is determined with each determination of the composition of crystalline substances in the sample, to compensate for the X-ray source flux to improve the quality of the analysis.

In an embodiment, the carrier is a continuously moving carrier including a holder and the powdered material is packed into the holder for presentation to the X-ray beam in the measurement station. Preferably, the continuously moving carrier includes a turntable and the holder is an endless groove in the turntable.

In an embodiment, the apparatus further includes a roller for smoothing and flattening an upper surface of the powdered material in the endless groove as the turntable moves and prior to the turntable conveying the powdered material into the measurement station. In the embodiment, the roller rotates at a speed corresponding to a speed of movement of the turntable. Further, the roller includes a tapered cone extending across a width of the groove so that a surface of the tapered cone rotates at a speed corresponding to the speed of movement across the width of the groove in the turntable.

Preferably, the roller includes a heating element to heat the roller to a designated temperature. The heating of the roller ensures that 'sticky' powdered material does not become a problem by attaching itself to the roller. If small amounts of material do attach to the roller it would result in an uneven or patchy upper surface of the powdered material in the groove, providing a poor bed for analysis and inaccurate results. The heating element enables the roller to be heated to a material dependent temperature. For example, for cement product, this temperature is around 90° C. The heated roller is speed matched to the speed of rotation of the turntable and the taper allows for no speed differential between the inner and outer tracks of the groove; thus providing a very smooth and flat surface of powdered material to be presented to the X-ray beam. In a further embodiment, the roller is curved to impart a slight curvature to the sample bed in the groove which aids in focusing the X-ray beams for XRD.

As mentioned, the rotating turntable is used to significantly increase the volume of sample that is being analysed from the above mentioned prior art static sample analyser. Hence, the number of diffraction conditions that are going to be experienced by particles in the sample is also increased. The traditional XRD systems described above use a sample plate with around 1 cm$^3$ of material and rely heavily on sample preparation to achieve reliable results. The apparatus, however, uses a much larger sample volume of around 150 times, which provides significant advantage such as better sample representation, greater number of diffraction conditions and less single particle effects which are averaged out over a large number of analysed X-ray diffraction patterns. By using a larger volume of powdered sample material for analysis, there is a much higher number of crystallites that line up in the X-ray beam producing diffracted beams, as per Braggs's Law ($2d \sin \theta = n\lambda$). The higher number of detected diffracted beams allow for a significant reduction (e.g. 10×) in X-ray power requirements and the relaxation of the requirement for a very fine particle size.

In an embodiment, the apparatus includes a hopper having a designated volume for receiving the powdered material from the grinder. The apparatus also includes a feeder (e.g. an auger screw), activated by the processor, for feeding the powdered material into the carrier. In use, the turntable is continuously rotated during analysis and carries the sample from the auger screw discharge into the groove at a constant rate, deliberately overfilling the groove. The overfilled powdered material is then rolled flat with the roller prior to analysis of the powdered material. The X-ray beams from the X-ray generator then illuminate the sample with a fixed beam whilst the sample in the carrier rotates. The sample is then scraped off and discharged into a container for disposal once it passes though the beam so that the entire sample in the hopper can pass through the beam and be analysed.

In an embodiment, the X-ray detector is a position sensitive detector for detecting X-ray diffraction patterns from a designated crystalline substance in the powdered material. At a fixed radius, this gives a fixed angular span. The X-ray generator further includes a low power X-ray tube configured to illuminate the powdered material with an X-ray beam at an angle corresponding to the region of interest of the designated crystalline substance.

In another embodiment, the X-ray detector is a strip detector, such as a multi-strip silicon strip detector that offers high count rates, high quantum efficiency and energy discrimination. This multi-strip detector has a narrow angular span due to its fixed pitch and channel count and is used in a zero degree configuration (e.g. static configuration). For example, the multi-strip silicon strip detector has 96 channels. This covers a much narrower region of interest in a single capture than, say, classical X-ray diffraction machines that use, for example, an area detector. It will be appreciated by those persons skilled in the art that energy discrimination is important in applications, such as cement analysis. The energy discrimination allows fluorescence to be suppressed—leading to much higher signal to noise and the use of more simple, standardised x-ray generating tubes. Also, the above mentioned low power X-ray tube (e.g. less than 100 W) is allowed due to the sample presentation in the groove of the carrier, including the designated particle size and designated sample volume. Typical prior art cement analysers use X-ray tube with power levels from 300-1200 W. It will be appreciated by those persons skilled in the art that power of the X-ray tube will be an appropriate wavelength of radiation for the sample material and the X-ray tube will have a suitable target angle for the sample material.

It will also be appreciated by those persons skilled in the art that the diffraction pattern of the sample includes distinct characteristic patterns (e.g. sharp peaks) corresponding to the crystalline phases of crystalline substances in the sample and a contribution to the broad background pattern from the non-crystalline phases in the sample. Both components contain noise from the components of the apparatus used to provide the diffraction patterns of the sample, such as the X-ray generator and the detector, which needs to be considered to arrive at the determination of the composition of crystalline substances in the sample In yet another embodiment, the measurement station includes an X-ray fluorescence generator for illuminating the powdered material with a further X-ray beam and an X-ray fluorescence detector for detecting fluorescence patterns from the powdered material. In this embodiment, the processor is configured to: receive the fluorescence patterns of the powdered material from the X-ray fluorescence detector; analyse the fluorescence patterns to determine a series of sequential elemental composition determinations of substances in the powdered material as the carrier conveys the powdered material through the measurement station; and determine elemental composition of the substances in the sample from the series of sequential elemental composition determinations.

X-Ray Fluorescence (XRF) uses the energy levels of atoms in the powdered material to cause fluorescence of the atoms and the characteristic energy of each emission allows for determination of the atoms. The XRF generator includes a tube of appropriate energy to excite the elements in question, such as cement minerals or Gold or Silver. It is will be appreciated by those persons skilled in the art that using energy appropriate to the target elements allows for the reduction in power of the XRF tube.

In an embodiment, the X-ray fluorescence generator illuminates the standard material with a further X-ray and the X-ray fluorescence detector detects fluorescence patterns from the standard material.

It will be appreciated by those persons skilled in the art that the term "processor" is used to refer generically to any device that can process data received from the X-ray diffraction detector and or the X-ray fluorescence detector to analyse the data, and may include: a microprocessor, microcontroller, or other computational device or a server. That is, the processor can be remote from the detector, in say a server, provided it is in data communication with the detector.

In another embodiment, the apparatus is arranged to improve results of the analysis of the material by reducing instances of the detector detecting scattered X-ray beams from the sample and the standard material, by using an anti-scatter disc disposed at the centre of the turntable.

Another aspect of the present invention provides a method of analysing particulate material having one or more crystalline substances, the method including: grinding a sample extracted from the particulate material into powdered material having a designated particle size; receiving the powdered material from the grinder in a carrier; conveying the powdered material in the carrier through a measurement station including an X-ray generator and an X-ray detector; illuminating the powdered material with an X-ray beam from the X-ray generator; detecting X-ray diffraction patterns from the powdered material at the X-ray detector; analysing the X-ray diffraction patterns to determine a series of sequential composition determinations of one or more crystalline substances in the powdered material as the carrier conveys the powdered material through the measurement station; and determining composition of the one or more crystalline substances in the sample from the series of sequential composition determinations.

In another aspect, the present invention extends to computer program code which, when executed, implements the above described method. In yet another aspect, the present invention also extends to a computer readable medium including the above program code.

BRIEF DESCRIPTION OF THE DRAWINGS

Embodiments of the present invention will now be described, by way of example only, with reference to the accompanying drawings, in which:

FIG. 3 is a schematic diagram of the apparatus of FIG. 1; and

FIG. 4 is a flow chart of a method according to an embodiment of the present invention.

DETAILED DESCRIPTION

Figure 1:
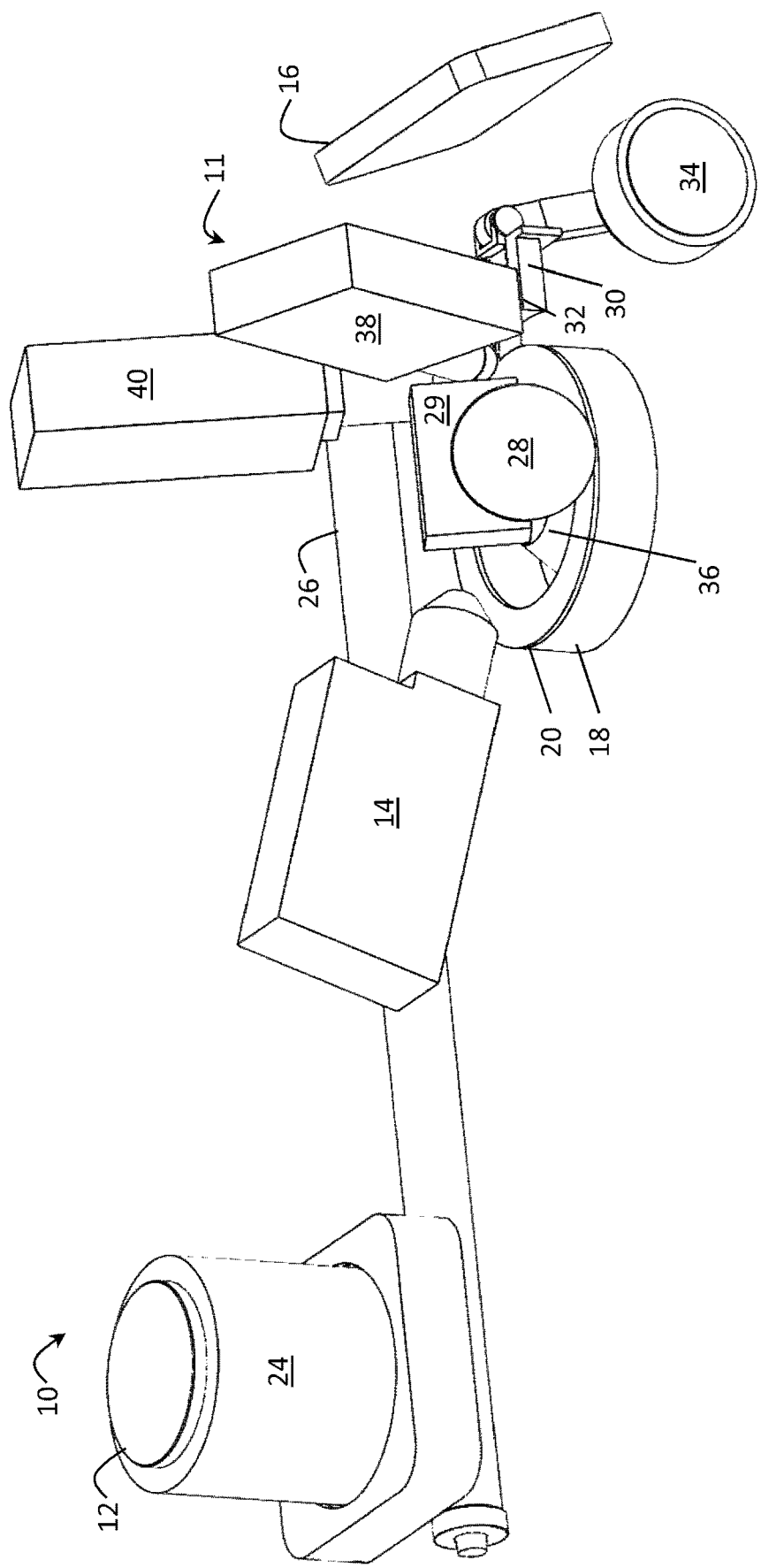
FIG. 1 is a perspective view of an apparatus for analysing material containing crystalline substances according to an embodiment of the present invention.

According to an embodiment there is provided an apparatus 10 for analysing particulate material having crystalline substances as shown in FIG. 1. The material to be analysed is extracted from particulate material in the form of, for example, cement product from a cement mill or cement clinker from a kiln. The material to be analysed is in dry powder form and, as mentioned above, could alternatively be an ore, a mineral process intermediary or residue, etc. In the embodiment, the particulate material also has amorphous and poorly crystalline substances, such as one or more of opaline silica, iron oxy hydroxides, components in fly ash and blast-furnace slag.

In use of the apparatus 10 shown in the Figures, a user extracts a sample of particulate material be analysed, from say a stream of cement clinker particulate, and provides it to a grinder 12 of the apparatus 10. The grinder 12 receives the sample and grinds it into a powdered material having a designated particle size. In the embodiment, the grinder 12 has a number of hardened alloy burrs enclosed in a housing that will allow coarse powdered materials with diameter less than 14 mm to be ground to a powder fine enough for analysis (e.g. 30% having less than a 45 µm particle size), but still relatively coarse in comparison to the above described prior art analyser.

The apparatus 10 also includes a measurement station 11 including an X-ray diffraction (XRD) generator 14 for illuminating the powdered material with an X-ray beam and an X-ray diffraction (XRD) detector 16 for detecting X-ray diffraction patterns from the powdered material. Further, the apparatus 10 includes a carrier 18 for receiving the powdered material from the grinder 12 and conveying the powdered material through the measurement station 11. The measurement station 11 further includes an X-ray fluorescence (XRF) generator 38 for illuminating the powdered material with a further X-ray beam and an X-ray fluorescence (XRF) detector 40 for detecting fluorescence patterns from the powdered material; the operation of the XRF generator 38 and XRF detector 40 will be discussed in more detail below.

The apparatus 10 further includes a processor 13, shown in FIG. 3, configured to: receive data indicative of the X-ray diffraction patterns of the powdered material from the XRD detector 16; analyse the X-ray diffraction patterns to determine a series of sequential composition determinations of one or more crystalline substances in the powdered material as the carrier 18 conveys the powdered material through the measurement station 11; determines composition of the one or more crystalline substances in the sample from the series of sequential composition determinations.

The processor 13 is further configured to output data indicative of the composition of crystalline substances in the sample to a display 15 for viewing by the user, as shown in FIG. 3. The display 15 is in data communication with the processor 13, and may be co-located with the apparatus 10 or may be remote from the apparatus 10 but in data communication via a network.

In an example, the apparatus 10 determines composition of free lime (CaO) in a cement clinker sample, and displays this information to the user on the display 15. Other minerals that could be determined using the apparatus 10 include Calcium Carbonate and Limestone. In this example, the X-ray detector 16 is a strip position sensitive detector for detecting X-ray diffraction patterns from free lime in the powdered material. And other strip position sensitive detectors could be employed by the X-ray detector 16 to detect X-ray diffraction patterns for other crystalline substances such as Calcium Carbonate and Limestone. In addition, or in the alternative, the processor 13 is further configured to output data indicative of the composition of crystalline substances in the sample to further apparatuses via a network for further analyses.

Figure 2:
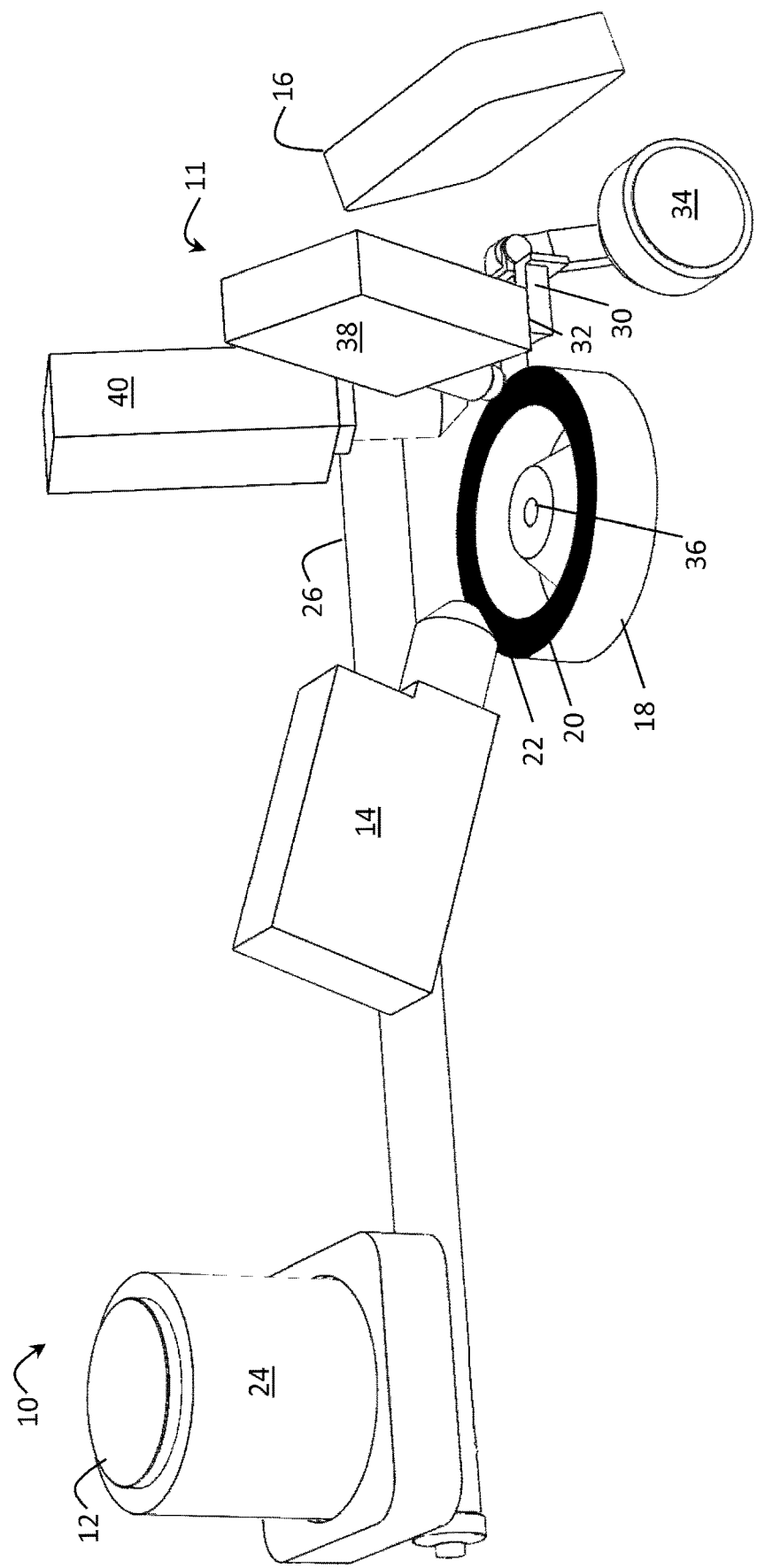
FIG. 2 is a perspective view of the apparatus of FIG. 1 showing a sample extracted from the stream of particulate material being conveyed by a carrier.

The carrier 18 of the embodiment shown in FIGS. 1 and 2 is a continuously moving carrier in the form of a horizontally orientated turntable 18, which is mounted for rotation in an anti-clockwise direction about a vertical axis and rotated by a driving means (not shown). The carrier 18, herein described as turntable 18, includes a holder for the powdered material in the form of an endless groove 20. That is, the groove 20 is disposed on the top surface of the turntable 18 and is configured to have the powdered material of the sample packed therein for presentation to the X-ray beam in the measurement station 11 to be analysed. Powdered material 22 packed into the groove 20 of the turntable 18 is shown in FIG. 2.

Thus, during an example of use of the apparatus 10, the grinder 12 receives the sample extracted from say the stream of cement clinker product from a cement mill, and grinds the sample into powdered material which is fed into a hopper 24 having a designated volume. The volume of the hopper 24 is designated to provide sufficient material for an accurate X-ray diffraction analysis—and also X-ray fluorescence analysis, described below—of the powdered material. The hopper 24 is connected to a feeder 26, such as a feed-screw, for continuously feeding the powdered material to be packed into the annular groove 20 as the turntable 18 rotates. In an embodiment, the feeder 26 is activated by the processor 13 for feeding the powdered material into the groove 20 until the hopper 24 is empty.

To pack the powdered material 22 into the groove 20 of the turntable 18 for presentation to X-ray beams in the measurement station 11, the apparatus includes a roller 28. The roller 28 is configured to smooth and flatten the upper surface of the powdered material 22 in the groove 20 prior to the turntable 18 conveying the powdered material 22 into the measurement station 11. The roller 28 is a driven roller located above the groove 20 adjacent the top of the turntable 18, and smooths and flattens the powdered material as it is fed into the groove 20 by the feeder 26. The roller 28 is configured to rotate at a speed corresponding to the speed of the turntable 18. After the powdered material 22 is analysed, it is removed by a scraper arrangement (not shown), or by a vacuum device (not shown), so that further powdered material 22 can be analysed.

In an embodiment, the roller 28 includes a precision height adjustment device to provide accurate positioning of the top surface of the powdered material 22 as required for X-ray diffraction analysis. In another embodiment, the roller 28 includes a tapered cone extending across a width of the groove 20 so that a surface of the tapered cone rotates at a speed corresponding to the speed of movement across the width of the groove 20 in the turntable 18. In yet another embodiment, the roller 28 includes a heating element 29 to heat the roller 28 to a designated temperature so that sticky powdered material does not become stuck to the roller 28. The heating element 29 is a heating block that heats the roller 28 to a temperature of around 90° C. for, say, cement product.

The packed powdered material 22, as shown in FIG. 2, is analysed by the apparatus 10 using X-ray diffraction (XRD) techniques. The XRD generator 14 of the embodiment has a low power X-ray tube configured to direct an X-ray beam onto the powdered material 22 in the measurement station 11 to illuminate the powdered material 22 continuously as the powdered material 22 rotates through the measurement station 11. The XRD detector 16 is configured to detect the diffracted X-ray beams from the powdered material 22 continuously and to send data to the processor 13 periodically (e.g. every second). The processor 13 is configured to process data from the XRD detector 16 to analyse the powdered material 22 to determine the series of sequential composition determinations of one or more crystalline substances in the powdered material 22. This series of sequential composition determinations is then analysed by the processor 13 to determine the composition of the one or more crystalline substances in the sample (e.g. free lime).

As mentioned, the XRD detector 16 in the embodiment is a position sensitive detector with a narrow angular span to detect X-ray diffraction patterns from free lime in the sample. Alternatively, the detector 16 is a single point detector combined with a goniometer to measure angular displacement. Use of other types of detector, such as an area detector, is also envisaged. In the embodiment, the XRD detector 16 collects detect X-ray diffraction patterns of the powdered material 22 over a narrow angle of around 6-7° for free lime analysis. In another embodiment, multiple detectors (e.g. 10) are used to form a contiguous spectrum to cover, say, a 55° range for detecting other crystalline substances at the same time. The angle is also dependent on the distance from the sample.

In an example, X-ray diffraction instrumentation includes:
  (i) Low power X-ray tube with radiation specific to application;
  (ii) Nickel Foil to remove unwanted wavelengths and Beam slits to define the beam size at the sample;
  (iii) 96 channel Multistrip sensor 120 µm pitch; and
  (iv) Computer built into the system to control data collection, analysis and result reporting.

Data is collected using software specifically designed and coded for interaction with the detectors. Data can be collected for any length of time summed over as many data sets as deemed necessary to obtain appropriate counting statistics. One example of such settings include: one second data collections with 180 data sets summed for analysis providing analyses every three minutes.

The apparatus 10 shown in the Figures includes a plate 30 with a standard material 32 encased in epoxy that is machined flat. For example, the standard material is aluminium powder mixed with epoxy resin at around 50-70%. The XRD detector 16 is configured to detect an X-ray diffraction pattern from the standard material 32. The plate 30 is connected to an actuator 34, controlled by the processor 13, to move the standard material 32 into a first position so that the X-ray beam from the XRD generator 14 illuminates the standard material 32 in the measurement station 11 and to a second positon not in the measurement station 11 where the XRD generator 14 cannot illuminate the standard material 32. The actuator 34 is configured to move the standard material 32 into the measurement station 11 before and or after the turntable 18 conveys the powdered material 22 through the measurement station 11. Alternatively, the actuator 34 is configured to move the standard material 32 into the measurement station 11 at the designated time intervals, e.g. every 600 seconds.

In the position in the measuring station 11, the actuator 34 to moves the standard material 32 to be in a position relative to the focal point of the XRD detector 16 that is the same as the position of the powdered material 22. That is, the standard material 32 is moved to be over the turntable 18 and is then illuminated by the X-ray beam. In this arrangement, the powdered material 22 is proud of the turntable by around 2 mm and the standard material 32 has a height of 2 mm so that when it is located in the focal point of the XRD detector 16 it is at the same height as the powdered material 22.

The processor 13 is configured to receive the X-ray diffraction pattern of the standard material 32 and compare the diffraction pattern of the standard material 32 with an expected diffraction pattern of the standard material 32 to determine a scale factor corresponding at least in part to a flux value of the X-ray generator. The processor 13 is configured to apply the scale factor to the series of sequential composition determinations of the one or more crystalline substances to compensate for the flux value and to determine a calibrated composition of the one or more crystalline substances in the sample. As mentioned, the x-ray tube of the XRD generator 14 reduces its flux with operational time due to various factors such as tungsten deposition, loss of vacuum, environmental temperature or partial filament failure. This flux is thus compensated for with the scale factor and to maintain accuracy of the determination of crystalline substances in the sample by the apparatus 10.

In addition, the apparatus 10 includes an anti-scatter disc 36 in the central section of the turntable 18 to minimise the scattering of X-ray beams from the central section of the turntable 18 so that the detector 16 detects mainly diffracted X-ray beams from the packed powdered material 22 in the groove 20 and from the standard material 32.

The actuator 34 includes components, such as a piston, lever and solenoid, that enable the plate 30 containing the standard material 32 to move into a location in the path of the X-ray beam before and or after the turntable 18 has conveyed the sample though the measurement station 11, and moves the plate 30 back after the detector 16 detects the diffracted X-ray beams from the standard material 32. Other methods of moving the standard material 32 are envisaged; for example, the standard material 32 is fed onto the turntable 18 so that it is at the same height and thus positioned relative to the same detector focal point as the powdered material 22. Also, in another embodiment, the turntable 18 height is dropped when the actuator 34 moves the standard material 32 into the path of the X-ray beam so that the standard material 32 is at the exact same height as the powdered material 22 was previously.

As mentioned, the measurement station 11 also includes an X-ray fluorescence (XRF) generator 38 for illuminating the powdered material 22 in the groove 20 with a further X-ray beam and an X-ray fluorescence (XRF) detector 40 for detecting fluorescence patterns from the powdered material 22. The processor 13 is configured to: receive the fluorescence patterns of the powdered material from the XRF detector 40; analyse the fluorescence patterns to determine a series of sequential elemental composition determinations of substances in the powdered material 22 as the carrier 18 conveys the powdered material 22 through the measurement station 11; and determine elemental composition of the substances in the sample from the series of sequential elemental composition determinations.

The determination of the elemental composition of substances in the sample is also determined using a "library" of patterns for each of the different substances. For example, the expected X-ray fluorescence pattern of Gold is stored in a library in a memory in data communication with the processor, and the processor compares the fluorescence pattern of Gold in the powdered material 22 detected by the XRF detector 40 with the stored expected diffraction pattern of Gold to determine Gold in the sample.

Referring to FIG. 4, there is shown a flow chart summarising a method 42 of analysing particulate material having one or more crystalline substances. The method 42 including: grinding 44 a sample extracted from the particulate material into powdered material having a designated particle size; receiving 46 the powdered material from the grinder in a carrier; conveying 48 the powdered material in the carrier through a measurement station including an X-ray generator and an X-ray detector; illuminating 50 the powdered material with an X-ray beam from the X-ray generator; detecting 52 X-ray diffraction patterns from the powdered material at the X-ray detector; analysing 54 the X-ray diffraction patterns to determine a series of sequential composition determinations of one or more crystalline substances in the powdered material as the carrier conveys the powdered material through the measurement station; and determining 56 composition of the one or more crystalline substances in the sample from the series of sequential composition determinations.

Further aspects of the method 42 will be apparent from the description of the apparatus 10. Persons skilled in the art will appreciate that the method 42 could be embodied in program code, for implementation by the processor 13, which could be suppled in number of ways; for example, on a computer readable medium, such as a disc or memory in data communication with the processor 13, or as a data signal, such as via transmission from a server. The processor 13 of the apparatus 10 can be a computer remote from the apparatus 10 or it can be located adjacent the apparatus 10; provided that it is configured to process the detected data from the XRD detector 16 and XRF detector 40 to determine composition of substances in the sample.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

It will be appreciated that the above description of the prior art has been provided merely as background to explain the context of the invention. It is not to be taken as an admission that any of the material referred to was published or known, or part of the common general knowledge.

The invention claimed is:

1. An apparatus for analysing particulate material having one or more crystalline substances, the apparatus including:
    a grinder for receiving a sample extracted from the particulate material and grinding the sample into powdered material having a designated particle size;
    a measurement station including an X-ray generator for illuminating the powdered material with an X-ray beam and an X-ray detector for detecting X-ray diffraction patterns from the powdered material;
    a carrier for receiving a designated volume of the powdered material from the grinder and conveying the powdered material through the measurement station at a designated speed; and
    a processor configured to:
        receive the X-ray diffraction patterns of the powdered material conveyed through the measurement station from the X-ray detector periodically;
        analyse the X-ray diffraction patterns to determine a series of sequential composition determinations of one or more crystalline substances in the powdered material as the carrier conveys the powdered material through the measurement station; and
        determine composition of the one or more crystalline substances in the sample from the series of sequential composition determinations,
    wherein the particulate material further has poorly crystalline and/or amorphous substances, and the processor is configured to determine composition of one or more poorly crystalline and/or amorphous substances in the powdered material, and
    wherein the powdered material includes a selected poorly crystalline and/or amorphous substance at a designated percentage of the powdered material, and the processor is configured to receive the X-ray diffraction pattern of the powdered material and compare the X-ray diffraction pattern of the powdered material with an expected X-ray diffraction pattern of the selected poorly crystalline and/or amorphous substance to determine a scale factor.

2. An apparatus as claimed in claim 1, wherein the designated volume conveyed by the carrier is based on the designated particle size of the powdered material.

3. An apparatus as claimed in claim 1, wherein the apparatus includes a plate with a standard material thereon, and the X-ray detector detects an X-ray diffraction pattern from the standard material.

4. An apparatus as claimed in claim 3, wherein the processor is configured to receive the X-ray diffraction pattern of the standard material and compare the diffraction pattern of the standard material with an expected diffraction pattern of the standard material to determine a further scale factor corresponding at least in part to a flux value of the X-ray generator.

5. An apparatus as claimed in claim 4, wherein the processor is configured to apply the further scale factor to the series of sequential composition determinations of crystalline substances to determine a calibrated composition of the one or more crystalline substances in the sample.

6. An apparatus as claimed in claim 3, wherein the plate is disposed on an actuator configured to move the standard material on the plate between a first position in the measurement station and a second position not in the measurement station.

7. An apparatus as claimed in claim 6, wherein the actuator is configured to move the standard material into the measurement station before and/or after the carrier conveys the powdered material through the measurement station.

8. An apparatus as claimed in claim 1, wherein the processor is configured to apply the scale factor to determine a calibrated composition of the one or more poorly crystalline and/or amorphous substances in the sample.

9. An apparatus as claimed in claim 8, wherein the processor is configured to determine a percentage of the selected poorly crystalline and/or amorphous substances in the sample from the calibrated composition.

10. An apparatus as claimed in claim 1, wherein the carrier is a continuously moving carrier, at said designated speed, including a holder and the powdered material is packed into the holder for presentation to the X-ray beam in the measurement station.

11. An apparatus as claimed in claim 10, wherein the continuously moving carrier includes a turntable and the holder is an endless groove in the turntable.

12. An apparatus as claimed in claim 11, wherein the apparatus further includes a roller for smoothing and flattening an upper surface of the powdered material in the endless groove as the turntable moves and prior to the turntable conveying the powdered material into the measurement station.

13. An apparatus as claimed in claim 12, wherein the roller rotates at a speed corresponding to a speed of movement of the turntable.

14. An apparatus as claimed in claim 13, wherein the roller includes a tapered cone extending across a width of the groove so that a surface of the tapered cone rotates at a speed corresponding to the speed of movement across the width of the groove in the turntable.

15. An apparatus as claimed in claim 12, wherein the roller includes a heating element to heat the roller to a designated temperature.

16. An apparatus as claimed in claim 12, the roller is curved to impart a curvature to the powdered material in the groove to aid in focusing the X-ray beam.

17. An apparatus as claimed in claim 1, wherein the apparatus includes a hopper for receiving the powdered material from the grinder and having a designated volume corresponding to the designated volume of the powdered material.

18. An apparatus as claimed in claim 17, wherein the apparatus includes a feeder, activated by the processor, for feeding the powdered material from the hopper into the carrier.

19. An apparatus as claimed in claim 18, wherein the feeder feeds the powdered material into the carrier at a flow rate corresponding to the designated speed of the carrier.

20. An apparatus as claimed in claim 1, wherein the X-ray detector is a position sensitive detector for detecting X-ray diffraction patterns from a designated crystalline substance in the powdered material.

21. An apparatus as claimed in claim 1, wherein the measurement station includes an X-ray fluorescence generator for illuminating the powdered material with a further X-ray beam and an X-ray fluorescence detector for detecting fluorescence patterns from the powdered material.

22. An apparatus as claimed claim 21, wherein the processor is configured to:
  receive the fluorescence patterns of the powdered material from the X-ray fluorescence detector;
  analyse the fluorescence patterns to determine a series of sequential elemental composition determinations of substances in the powdered material as the carrier conveys the powdered material through the measurement station; and
  determine elemental composition of the substances in the sample from the series of sequential elemental composition determinations.

* * * * *